(12) United States Patent
Oosthuysen et al.

(10) Patent No.: US 8,205,784 B1
(45) Date of Patent: Jun. 26, 2012

(54) SYSTEMS AND METHODS FOR JOINING METAL

(75) Inventors: Riaan Oosthuysen, Tyler, TX (US); Richard Alan Stewart, Canton, TX (US)

(73) Assignee: Trane International Inc., Piscataway, NJ (US)

( * ) Notice: Subject to any disclaimer, the term of this patent is extended or adjusted under 35 U.S.C. 154(b) by 0 days.

(21) Appl. No.: 13/097,801

(22) Filed: Apr. 29, 2011

(51) Int. Cl.
*B23K 31/02* (2006.01)
*B23K 5/00* (2006.01)

(52) U.S. Cl. ............ 228/43; 228/47.1; 228/59; 228/902

(58) Field of Classification Search ........................ None
See application file for complete search history.

(56) References Cited

U.S. PATENT DOCUMENTS

| | | | | |
|---|---|---|---|---|
| 1,537,177 A * | 5/1925 | Lutz | ............... | 228/144 |
| 1,866,044 A * | 7/1932 | Krebs | ............... | 219/74 |
| 1,914,881 A * | 6/1933 | Buehring | ............... | 228/200 |
| 1,994,700 A * | 3/1935 | Halbing et al. | ............... | 228/53 |
| 2,036,733 A * | 4/1936 | Kehl | ............... | 228/25 |
| 3,665,147 A * | 5/1972 | Schobel et al. | ............... | 219/130.1 |
| 3,702,692 A * | 11/1972 | Metzger et al. | ............... | 432/77 |
| 3,735,911 A * | 5/1973 | Ward | ............... | 228/19 |
| 3,756,489 A * | 9/1973 | Chartet | ............... | 228/43 |
| 3,817,198 A * | 6/1974 | Leblois | ............... | 413/25 |
| 3,981,428 A * | 9/1976 | Przybylla | ............... | 228/175 |
| 4,019,671 A * | 4/1977 | Akyuerek | ............... | 228/123.1 |
| 4,119,137 A * | 10/1978 | Eberle | ............... | 164/332 |
| 4,164,310 A * | 8/1979 | Di Giacomo et al. | ............... | 228/58 |
| 4,170,726 A | 10/1979 | Okuda | | |
| 4,298,154 A * | 11/1981 | DeFusco | ............... | 228/49.1 |
| 4,576,323 A * | 3/1986 | Ohnishi | ............... | 228/29 |
| 4,642,752 A * | 2/1987 | Debarbieri et al. | ............... | 700/160 |
| 5,090,898 A * | 2/1992 | Smith | ............... | 431/326 |
| 5,121,873 A * | 6/1992 | Sekiya et al. | ............... | 228/170 |
| 5,172,849 A * | 12/1992 | Barten et al. | ............... | 228/18 |
| 5,249,954 A | 10/1993 | Allen et al. | | |
| 5,271,545 A | 12/1993 | Boswell et al. | | |
| 5,341,978 A * | 8/1994 | Halstead et al. | ............... | 228/42 |
| 5,427,305 A * | 6/1995 | Nishimura | ............... | 228/233.2 |
| 5,617,778 A * | 4/1997 | Schroeter et al. | ............... | 99/446 |
| 5,769,304 A | 6/1998 | Kuchenhart | | |
| 5,934,541 A * | 8/1999 | Costa | ............... | 228/44.3 |
| 5,979,741 A * | 11/1999 | Iguchi | ............... | 228/44.3 |
| 6,129,258 A | 10/2000 | Boswell et al. | | |
| RE36,960 E * | 11/2000 | Boswell et al. | ............... | 228/43 |
| 6,471,114 B2 * | 10/2002 | Pearl et al. | ............... | 228/178 |
| 6,866,089 B2 | 3/2005 | Avila | | |
| 7,997,189 B1 * | 8/2011 | Baker et al. | ............... | 99/386 |
| 2001/0041318 A1 * | 11/2001 | Pearl et al. | ............... | 431/354 |
| 2003/0201302 A1 * | 10/2003 | Tonjes et al. | ............... | 228/10 |
| 2005/0284421 A1 * | 12/2005 | Penner et al. | ............... | 122/16.1 |

FOREIGN PATENT DOCUMENTS

| | | | | |
|---|---|---|---|---|
| JP | 58-128269 A | * | 7/1983 | |
| JP | 63-248570 A | * | 10/1988 | |
| JP | 02-127971 A | * | 5/1990 | |
| JP | 02-284796 A | * | 11/1990 | |
| JP | 06-262344 A | * | 9/1994 | |

* cited by examiner

*Primary Examiner* — Kiley Stoner
(74) *Attorney, Agent, or Firm* — Conley Rose, P.C.; J. Robert Brown, Jr.

(57) ABSTRACT

A metal joining system having a first burner assembly configured to selectively heat a first zone and an assembly support at least partially vertically lower than at least a portion of the first heat zone and a first hood vertically above at least a portion of the assembly support.

12 Claims, 6 Drawing Sheets

SYSTEMS AND METHODS FOR JOINING METAL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Joining metal components may be accomplished by heating the metal components to be joined. In some cases, the metal components themselves may be heated to a temperature sufficient to at least partially melt portions of one or both of the metal components. With at least one of the metal components at least partially melted, the components may be caused to contact each other and thereafter allowed to solidify into a joined integral component. In some cases, filler material and/or cleaning flux may be disposed on one or both of the metal components to promote and/or enable the joining of the metal components. In some cases, fuel may be combusted to produce heat and/or heated combustion gasses that may be used to heat at least one of the metal components to be joined.

SUMMARY OF THE DISCLOSURE

In some embodiments, a metal joining system comprising, a first burner assembly configured to selectively heat a first zone, an assembly support at least partially vertically lower than at least a portion of the first heat zone, and a first hood vertically above at least a portion of the assembly support.

In other embodiments, a method of joining metal components comprising directing heat to a concavity of a hood, heating a first metal component and a second metal component with the heat directed to the concavity of the hood is provided.

In other embodiments, a system for joining metal components comprising a conveyor configured to carry a first metal component and a second metal component, a hood comprising a concavity that is open at least partially toward the conveyor, and a burner configured to direct heat into the concavity of the hood.

DETAILED DESCRIPTION

Systems and methods of joining metal components may comprise brazing and/or soldering. Some brazing and/or soldering methods may comprise so-called open flame methods where fuel is combusted and the heated combustion gasses are used to heat the metal components to be joined. In some cases, a brazing composition, such as a metal alloy, may be positioned between the two metal components and thereafter melted to form a seal and/or otherwise join the metal components. In some cases, the surfaces to be joined using the brazing composition may be referred to as the faying surfaces. The brazing process may further utilize a chemical flux to prepare the faying surfaces to accept the brazing composition. In some cases, the flux and brazing composition may be applied in through the use of so-called braze rings such as those disclosed in U.S. patent application Ser. No. 12/362,655 filed Jan. 30, 2009 and entitled "Braze Ring," and which is hereby incorporated herein by reference.

In some cases of open flame metal joining, temperature control over the metal components to be joined may not be sufficiently predictable. Similarly, in some cases where multiple sets of metal components are to be joined during a same period, temperature control and/or uniformity of the metal components of the multiple sets may not be sufficiently predictable. Still further, in some open flame metal joining systems, the metal joining method may be substantially closed loop relative to actual temperatures achieved at and/or near one or more of the metal components to be joined.

Accordingly, the present disclosure provides systems and methods for improving temperature uniformity of the metal components during the process of joining the metal components. In some embodiments, such improved temperature uniformity may be achieved by providing a hood that at least temporarily captures, circulates, and/or mixes heated combustion gasses rather than allowing the combustion gasses to merely rise away from the metal components or from near the metal components in an unfettered manner. Further, the present disclosure provides systems and methods for ensuring that the metal components to be joined are raised to suitable temperatures in spite of varying environmental temperatures and fluid flows. In some embodiments, such improved control over the temperatures of the metal components may be achieved by providing a plurality of heating zones, the temperature of a subsequent heating zone being controlled as a function of the temperature of the metal components exiting a prior heating zone.

Figure 1:
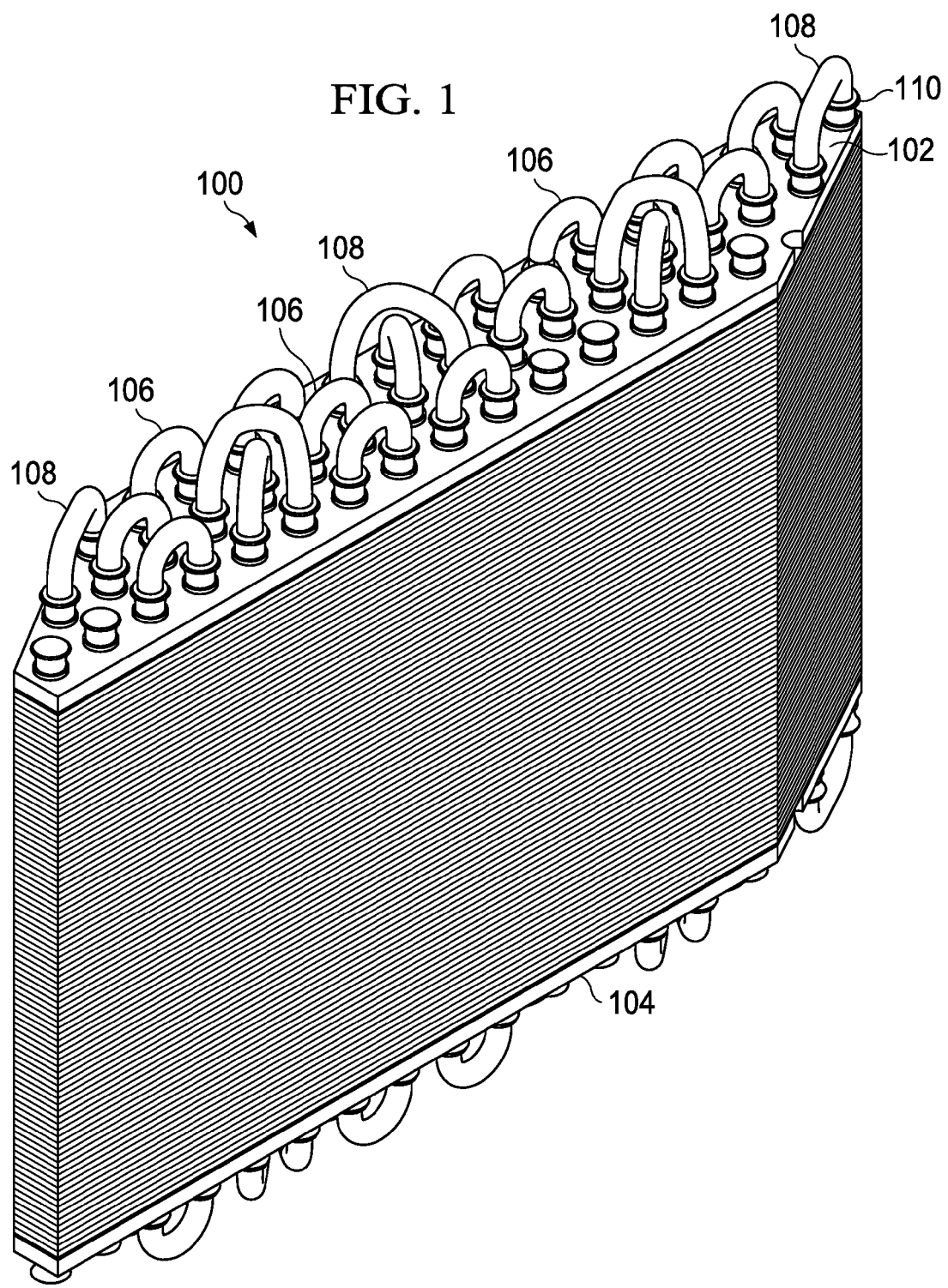
FIG. 1 is an oblique view of a heat exchanger slab.

Referring now to FIG. 1, an oblique view of an HVAC heat exchanger slab 100 is shown. In this embodiment, the heat exchanger slab 100 comprises a plurality of substantially straight tubes that generally extend between a first end plate 102 and a second end plate 104. Adjacent pairs of straight tubes may be joined in fluid communication near the first end plate 102 by return bends 106 or crossovers 108. Each return bend 106 and/or crossover 108 may be received in and joined to flared ends 110 of adjacent straight tubes via systems and methods joining metal components described herein. The heat exchanger slab 100 may, in a non-final stage of assembly, comprise braze rings disposed concentrically about the exterior of a straight end of a return bend 106 and also be abutted against the flared end 110 of a straight tube.

Figure 2:
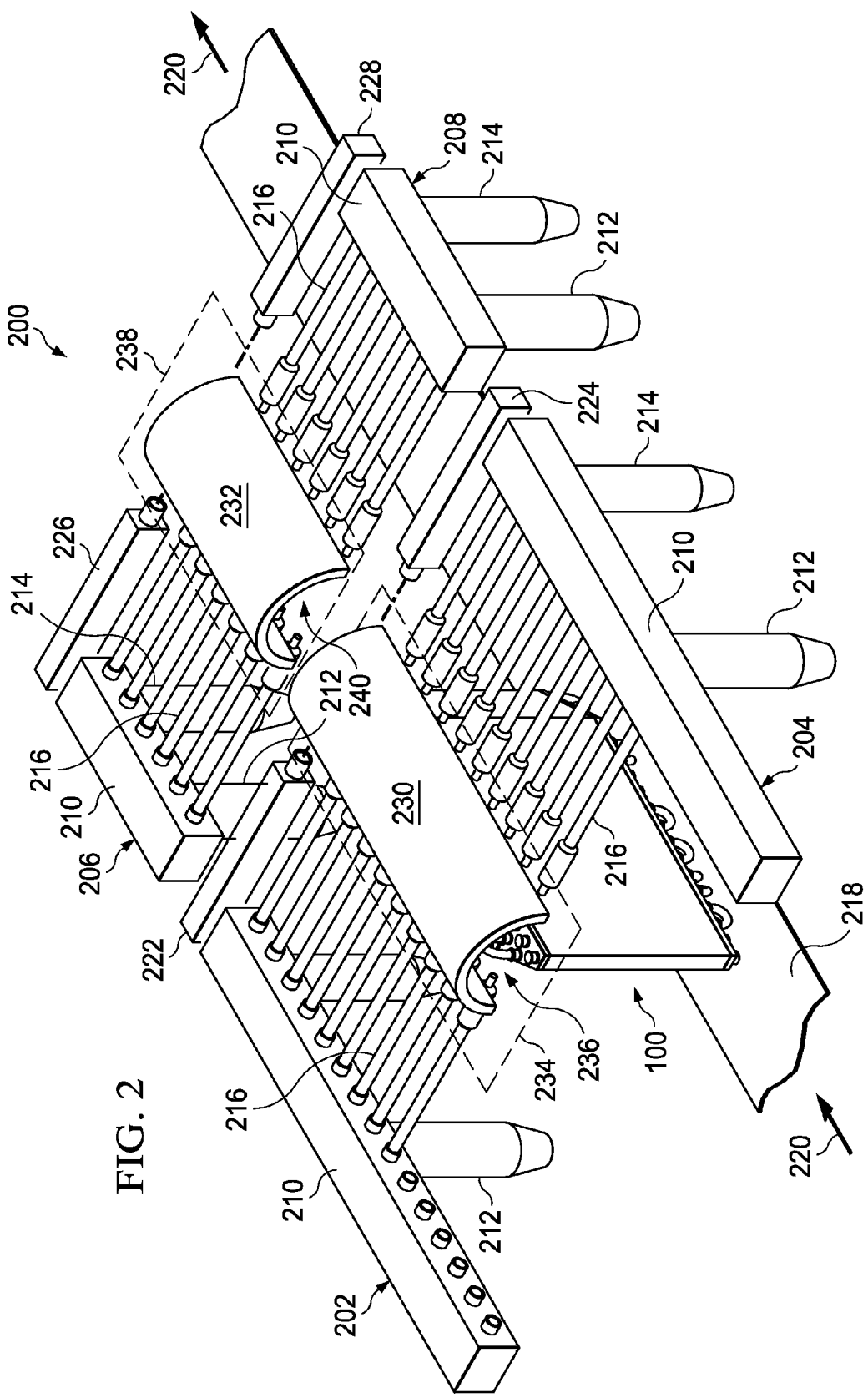
FIG. 2 is an oblique view of a metal joining system according to an embodiment of this disclosure.
Figure 3:
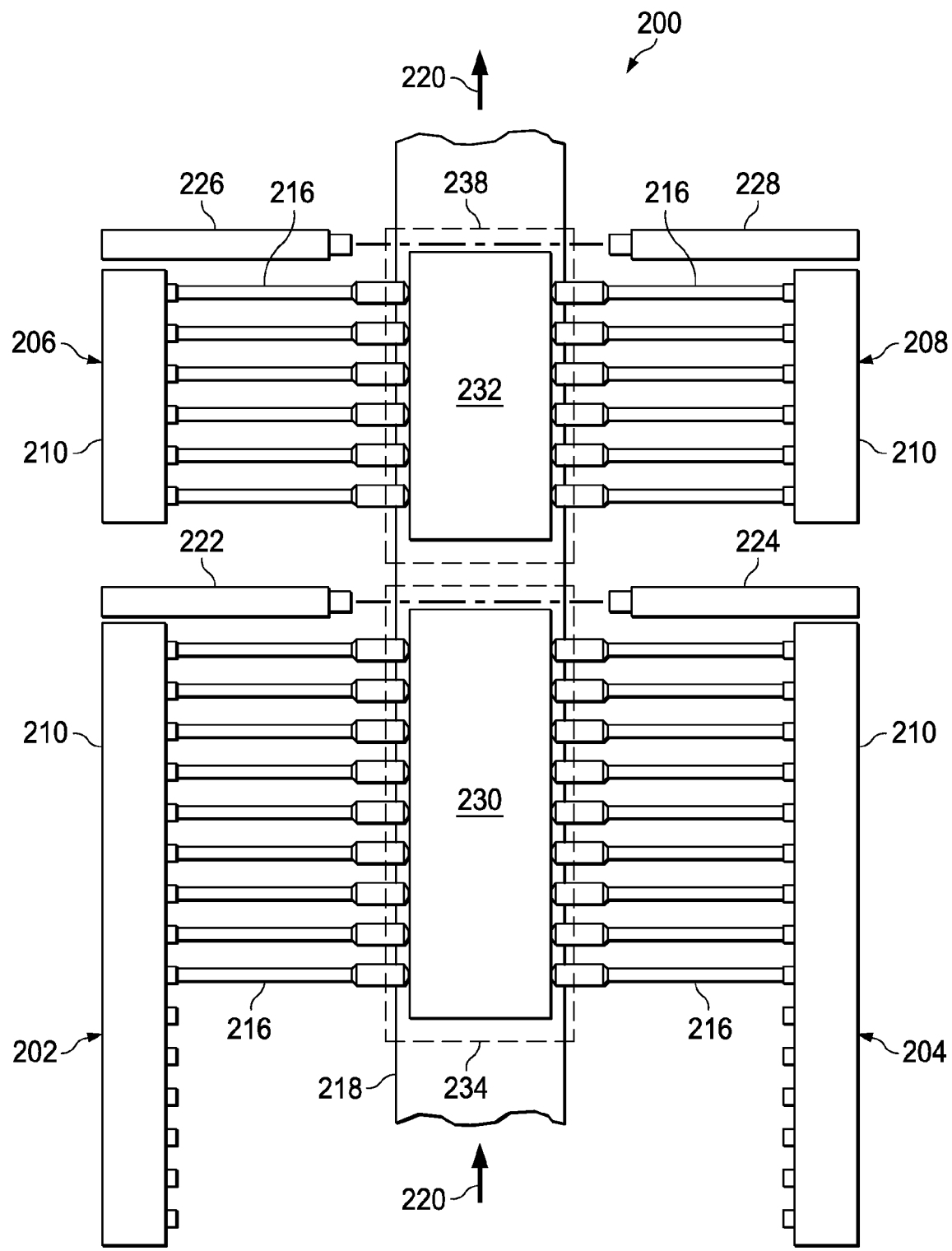
FIG. 3 is an orthogonal top view of the metal joining system of FIG. 2.
Figure 4:
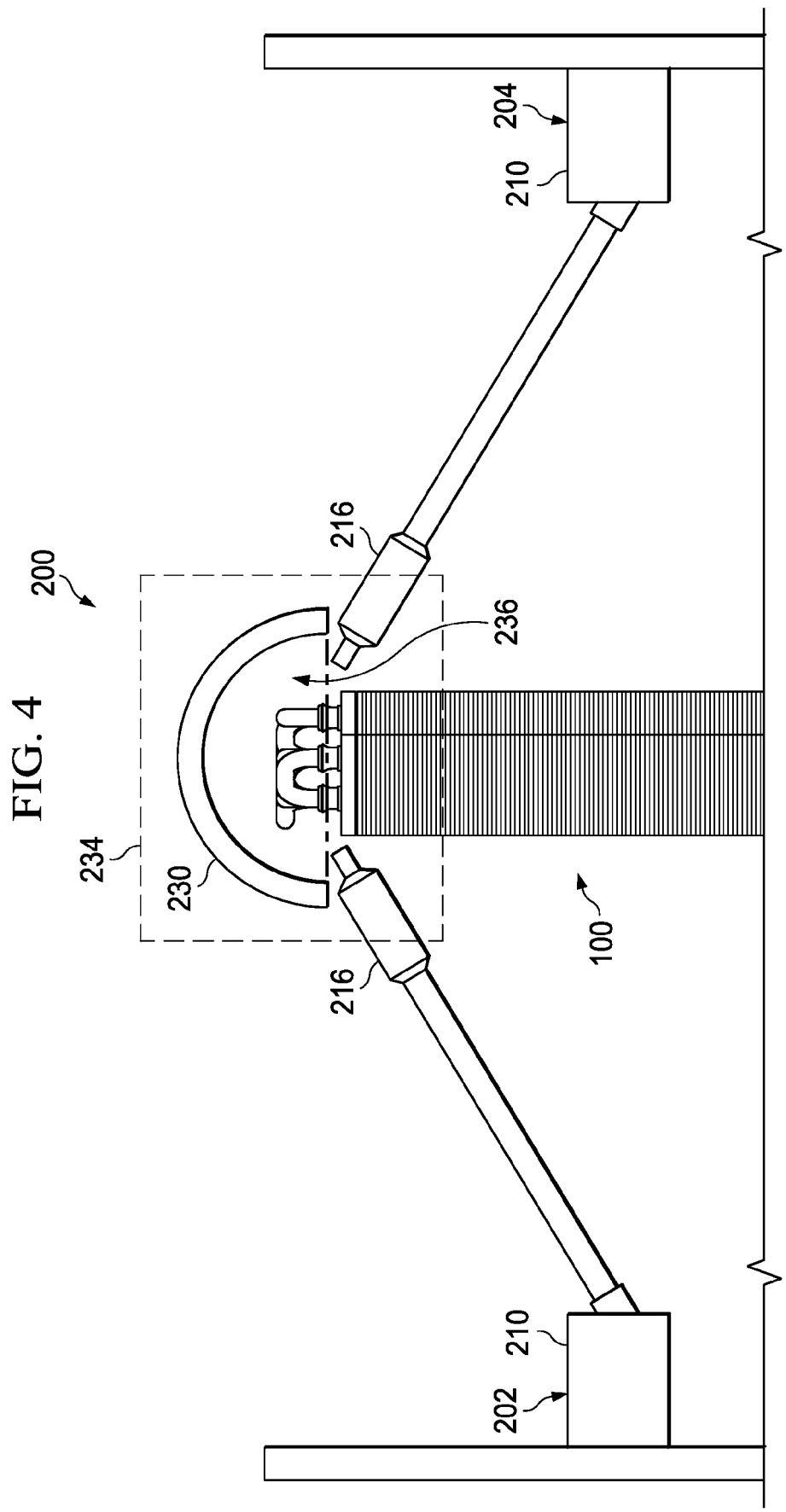
FIG. 4 is an orthogonal end view of the metal joining system of FIG. 2.

Referring now to FIGS. 2-4, a metal joining system 200 is shown. FIG. 2 provides an oblique view of the metal joining system 200, FIG. 3 provides an orthogonal top view of the metal joining system 200, and FIG. 4 provides an orthogonal end view of the metal joining system 200. The metal joining system 200 comprises a left first zone burner assembly 202, a right first zone burner assembly 204, a left second zone burner assembly 206, and a right second zone burner assembly 208. Each burner assembly 202, 204, 206, 208 comprises a mixing chamber 210, a fuel input 212, an air input 214, and a plurality of burners 216. In some embodiments, the fuel flow rates provided to the various independent fuel inputs 212 may be controlled using mass flow valves. In some embodiments, air flow rates may be achieved using a variable frequency drive that controls a blower. The metal joining system 200 further comprises a plurality of pyrometers for selectively measuring the temperature of a slab 100 that is carried along a conveyor 218 in a front to back direction as indicated by arrows 220. The metal joining system 200 further comprises a left first zone pyrometer 222, a right first zone pyrometer 224, a left second zone pyrometer 226, and a right first zone pyrometer 228.

The metal joining system further comprises a first zone hood 230 and a second zone hood 232. In some embodiments, the first zone hood 230 is vertically offset from the conveyor 218 so that as a slab 100 or other part is conveyed through a first zone 234 generally associated with the burner assemblies 202, 204, a portion of the slab 100 passes through a concavity 236 of the first zone hood 230. Similarly, in some embodiments, the second zone hood 232 is vertically offset from the conveyor 218 so that as a slab 100 or other part is conveyed through a second zone 238 generally associated with the burner assemblies 206, 208, a portion of the slab 100 passes through a concavity 240 of the second zone hood 232.

In some embodiments, the metal joining system may be operated to move a slab 100 or other part and/or assembly in the direction indicated by arrows 220. In some embodiments, the burner assemblies 202, 204 may be operated to heat an aluminum slab 100 to approximately 500° within about 60 seconds or less. In some embodiments, one or more thermocouples may be located relative to the slab 100 so that feedback provided by the thermocouples may be used to ensure that the burner assemblies 202, 204 actually cause the slab 100 to obtain the approximately 500° over various locations of the slab 100. In particular, a thermocouple may be located just above the slab 100 in a top portion of the concavity 236 of the first zone hood 230.

In some embodiments, the slab 100 or other part and/or assembly may be moved by the conveyor 218 at substantially a constant velocity relative to the burner assemblies 202, 204, 206, 208. As the slab 100 exits the first zone 234, one of the pyrometers, in some embodiments, the left first zone pyrometer 222 may measure a temperature of the slab 100 near a front end of the top surface of the first end plate 102 while the right first zone pyrometer 224 may later measure a temperature of the slab 100 near a rear end of the top surface of the first end plate 102.

In some embodiments, the slab 100 may progress from the first zone 234 into the second zone 238. In some embodiments, the burner assemblies 206, 208 may be operated to heat the aluminum slab 100 to approximately 600° within about 45 seconds or less. As the slab 100 exits the second zone 238, one of the pyrometers, in some embodiments, the left second zone pyrometer 226 may measure a temperature of the slab 100 near a front end of the top surface of the first end plate 102 while the right second zone pyrometer 228 may later measure a temperature of the slab 100 near a rear end of the top surface of the first end plate 102.

In some embodiments, the temperature measurements of the left and right first zone pyrometers 222, 224 may occur on a repeating basis of about once every five seconds and may be averaged over a selected set limit. In some embodiments, the temperature measurements taken of the slab 100 in the first zone 234 may be used not only to adjust the operation of the burner assemblies 202, 204, but also the operation of the burner assemblies 206, 208. In some embodiments, the temperature measurements taken by the pyrometers 222, 224, 226, 228 may be associated with a location about 0.25 inches below a joint between the straight tubes and connected return bends 106 and crossovers 108. In some embodiments, the temperature of the second zone 238 applied to the slab 100 may be relatively increased in response to a relatively lower temperature measurement recorded by one or more of the first zone pyrometers 222, 224. In some cases, such temperature adjustment may be responsive on a left-right side differential basis so that a left side temperature of the second zone 238 may be increased in response to a lower temperature reported by the left first zone pyrometer 222. In some embodiments, programmable logic controllers may be used to control the measurement of temperature and adjustment of burner assemblies 202, 204, 206, 208.

Referring again to FIG. 4, in some embodiments, burners 216 may be located differently than as shown. One or more burner 216 of one or more burner assembly 202, 204, 206, 208 may be directed in any suitable direction relative to the hoods 230, 232 to cause heated combustion gas to enter the concavities 236, 240. Such direction of the heated combustion gas, in some embodiments, may temporarily entrap or otherwise prevent escape of the heated combustion gas from the concavities 236, 240, thereby mixing the gasses and providing a space of improved temperature homogeneity throughout the concavities 236, 240 and spaces near the external boundaries of the concavities 234, 238. Specifically, in some embodiments, a burner 216 and/or burner assembly 202, 204, 206, 208 may be located differently than shown in FIGS. 2-4 while still providing improved metal joining for the components of slab 100 due to the improved control over temperature gradients within the first and second zones 236, 240. In some embodiments, the burners 216 may direct heat to a location between the top surface of the first end plate 102 and an external boundary of a concavity 236, 240 so that major portions of heat are directed into the concavities 236, 240.

Figure 5:
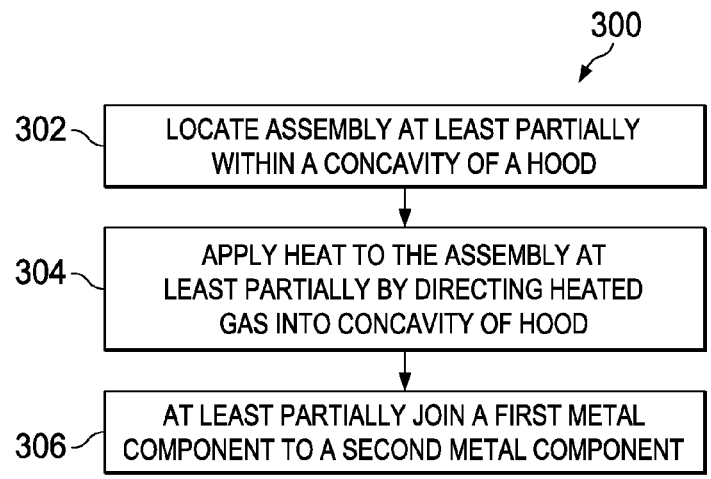
FIG. 5 is a flowchart of a method of joining metal components according to an embodiment of this disclosure.

Referring now to FIG. 5, a flowchart of a method 300 of joining metal is shown. At block 302, in some embodiments, metal components may be joined by first locating an assembly, such as a slab 100, comprising a plurality of metal components at least partially within a concavity of a hood, such as hoods 230, 232. At block 304, heat may be applied to the assembly at least partially by directing heated gas into the concavity, such as concavities 236, 240, of the hoods 230, 232. At block 306, the metal components of the assembly may be at least partially joined, in some embodiments, by melting one or more of the metal components themselves, and in other embodiments, by melting another component and/or material to form a joint between the metal components.

Figure 6:
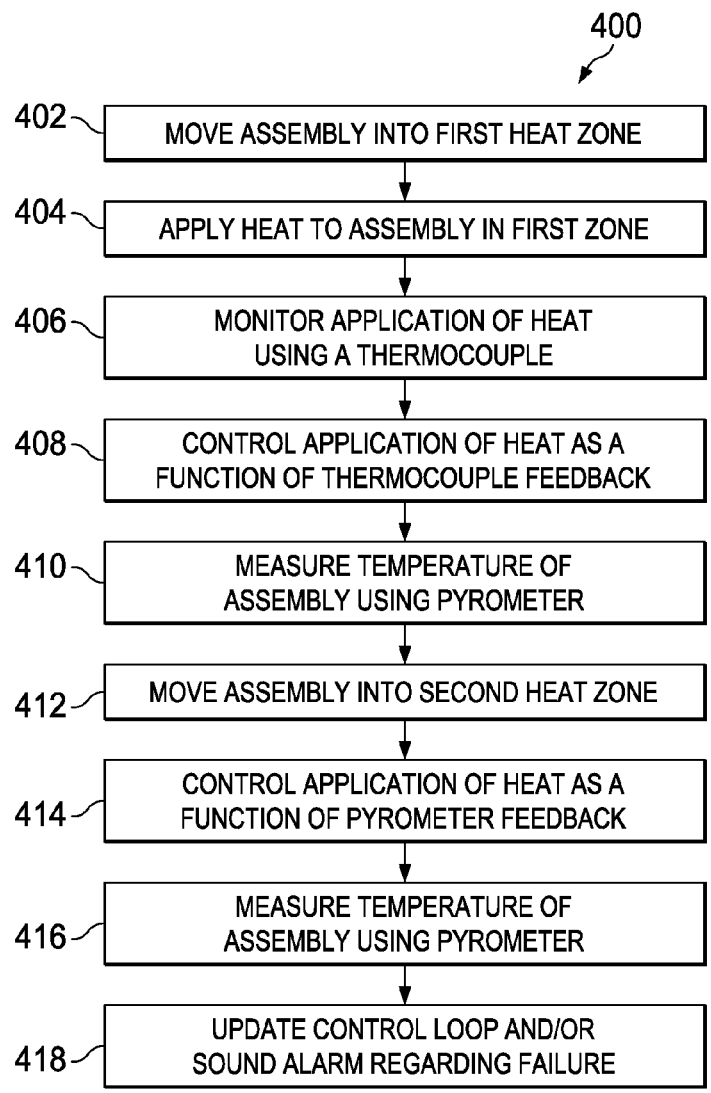
FIG. 6 is a flowchart of another method of joining metal components according to an embodiment of this disclosure.

Referring now to FIG. 6, a flowchart of another method 400 of joining metal is shown. At block 402, an assembly may be moved into a first heat zone. At block 404, heat may be applied to the assembly while the assembly is in the first heat zone. At block 406, a temperature of the assembly and/or the application of heat may be monitored using a thermocouple. At block 408, the application of heat may be provided as a function of feedback from the thermocouple. At block 410, a temperature of the assembly may be measured by a first pyrometer. At block 412, the assembly may be moved into a second heat zone. At block 414, heat may be applied to the assembly as a function of feedback from the first pyrometer.

At block 416, a temperature of the assembly may be measured by a second pyrometer. At block 418, a control loop related to at least one of fuel and/or airflow rates, any preheat times and/or conveyor speeds, temperature set points and/or temperature goals for one or more heat zones, and/or an operational parameter of a cooling air flow may be updated and/or revised as a function of feedback from the first and/or second pyrometers. Further, at block 418, an alarm may be sounded and/or an alert may be provided if the pyrometer feedbacks indicate that the metal components of the assembly may not be successfully joined.

Figure 7:
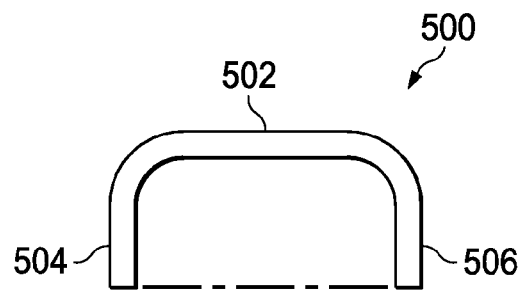
FIG. 7 is an oblique view of another hood configured for use with the metal joining system of FIG. 1.

Referring now to FIG. 7, an orthogonal end view of another embodiment of a hood 500 is shown. In this embodiment, hood 500 comprises an upper wall 502 that is substantially planar and which is connected to left and right walls 504, 506, respectively, that extend substantially normal relative to the planar upper wall 502.

Figure 8:
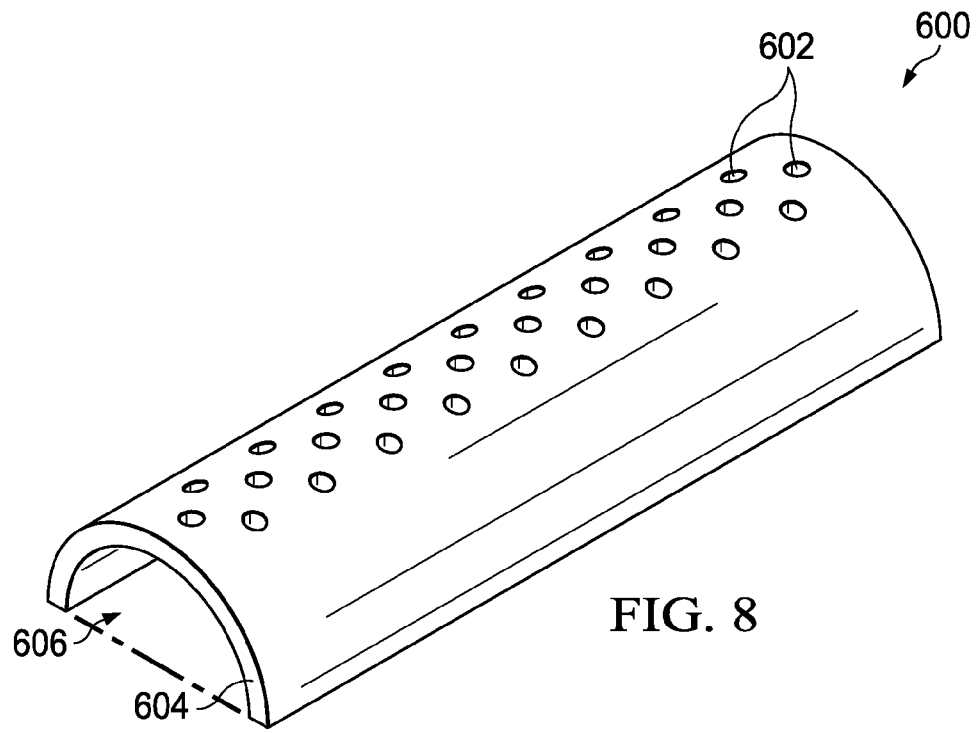
FIG. 8 is an orthogonal end view of another hood configured for use with the metal joining system of FIG. 1.

Referring now to FIG. 8, an oblique view of another embodiment of a hood 600 is shown. In this embodiment, hood 600 comprises a plurality of through holes 602 extending generally vertically through the curved wall 604 of the hood 600. In some embodiments, addition or removal of holes 602 in a hood may provide control over how much and/or how long hot gasses are retained within a concavity 606 of the hood 600.

Figure 9:
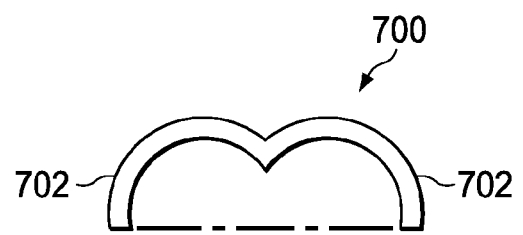
FIG. 9 is an orthogonal end view of yet another hood configured for use with the metal joining system of FIG. 1.

Referring now to FIG. 9, an orthogonal end view of another embodiment of a hood 700 is shown. In this embodiment, hood 700 comprises a wall comprising two arc sweeps 702 as viewed on the end of the hood 700. In some embodiments, the hood 700 may comprise a thickness of about 0.375 inches, the arc sweeps 702 may comprise an angular sweep of about 200°, the radius of the arc sweeps may be about 1.5 inches, and a longitudinal distance between outermost endpoints of the arc sweeps 702 may be about 5.5 inches.

In some embodiments, a system for joining metal components may comprise more or fewer heat zones, hoods, thermocouples, pyrometers, and/or burner assemblies than described in the embodiments above. Further, in some embodiments, a system for joining metal components may comprise multiple heat zones and only one hood. Alternatively, some embodiments may comprise a single heat zone and multiple hoods.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k(Ru-Rl)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. While the Figures of the drawings are not necessarily to scale, this disclosure expressly contemplates that one or more of the Figures may disclose a scaled and/or accurate representation of one or more embodiments. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. A metal joining system, comprising:
a first burner assembly configured to selectively heat a first zone, the first burner assembly comprising a burner; and
an assembly support at least partially vertically lower than at least a portion of the first heat zone, the assembly support comprising a conveyor; and
a first hood vertically above at least a portion of the assembly support, the first hood comprising a concavity, the concavity comprising an open entry side, an open exit side, an open first side, and an open second side, wherein at least one of the first side and the second side are configured to prevent an outflow of heated fluid from the concavity relatively more effectively than at least one of the entry side and the exit side when the outflow is substantially due to a buoyancy of the heated fluid;
wherein at least one of the first side and the second side are configured to receive at least one of (1) at least a portion of the first burner assembly and (2) the heat generated by the first burner assembly into the concavity through an open space below the at least one of the first side and the second side.

2. The metal joining system of claim 1, further comprising:
a second heat zone;
wherein the conveyor is configured to selectively move from the first heat zone to the second heat zone.

3. The metal joining system of claim 2, further comprising:
a second burner assembly associated with the second heat zone;
a second hood associated with the second heat zone; and
a second burner assembly configured to direct heat into a concavity of the second hood.

4. The metal joining system of claim 3, wherein at least a portion of at least one of the concavity of the first hood and the concavity of the second hood is open toward the conveyor.

5. The metal joining system of claim 4, wherein at least one of the concavity of the first hood and the concavity of the second hood comprise a plurality of holes configured to allow passage of hot fluid therethrough.

6. The metal joining system of claim 5, further comprising:
a pyrometer configured to sense a temperature of an object carried by the conveyor when the object is at least partially located between the first heat zone and the second heat zone.

7. The metal joining system of claim 5, further comprising:
a pyrometer configured to sense a temperature of an object carried by the conveyor when the object is at least partially exiting the second heat zone.

8. A system for joining metal components, comprising:

a conveyor configured to carry a first metal component and a second metal component; and a hood comprising a concavity that is open at least partially toward the conveyor, the concavity comprising an open entry side, an open exit side, an open first side, and an open second side, wherein at least one of the first side and the second side are configured to prevent an outflow of heated fluid from the concavity relatively more effectively than at least one of the entry side and the exit side when the outflow is substantially due to a buoyancy of the heated fluid;

wherein at least one of the first side and the second side are configured to receive at least one of (1) at least a portion of a burner and (2) heat generated by the burner into the concavity through an open space below the at least one of the first side and the second side.

9. The system for joining metal components of claim 8, wherein the hood is configured to impede escape of heat directed into the concavity of the hood.

10. The system for joining metal components of claim 8, wherein the concavity is configured to receive at least a portion of the first metal component and the second metal component.

11. The system for joining metal components of claim 8, wherein the burner is configured as an open flame burner configured to produce heat sufficient for joining the first metal component and the second metal component by brazing.

12. The system for joining metal components of claim 8, further comprising:

at least one of a pyrometer and a thermocouple configured to provide feedback associated with a temperature of at least one of the first metal component and the second metal component.

* * * * *